United States Patent
Solis et al.

(10) Patent No.: US 9,536,059 B2
(45) Date of Patent: Jan. 3, 2017

(54) METHOD AND SYSTEM FOR VERIFYING RENAMED CONTENT USING MANIFESTS IN A CONTENT CENTRIC NETWORK

(71) Applicant: Palo Alto Research Center Incorporated, Palo Alto, CA (US)

(72) Inventors: Ignacio Solis, South San Francisco, CA (US); Marc E. Mosko, Santa Cruz, CA (US); Ersin Uzun, Campbell, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 53 days.

(21) Appl. No.: 14/571,083

(22) Filed: Dec. 15, 2014

(65) Prior Publication Data

US 2016/0171184 A1 Jun. 16, 2016

(51) Int. Cl.
  G06F 21/10 (2013.01)
  G06F 21/44 (2013.01)
  H04L 29/08 (2006.01)

(52) U.S. Cl.
  CPC .......... *G06F 21/10* (2013.01); *G06F 21/44* (2013.01); *H04L 67/1068* (2013.01); *G06F 2221/0791* (2013.01)

(58) Field of Classification Search
  CPC .. G06F 21/10; G06F 21/44; G06F 2221/0791; H04L 67/1068
  See application file for complete search history.

(56) References Cited

U.S. PATENT DOCUMENTS

| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Jacobson, V. et al., "Networking Named Content", CoNEXT'09 Dec. 1-4, 2009, Rome, Italy. ACM 2009.*

(Continued)

*Primary Examiner* — Jung Kim
*Assistant Examiner* — Christopher Ruprecht
(74) *Attorney, Agent, or Firm* — Shun Yao; Park, Vaughan, Fleming & Dowler LLP

(57) ABSTRACT

One embodiment provides a system that facilitates redistribution of content objects with a different name without requiring re-computation of the original authentication information. During operation, the system determines, by a content producing device, an original manifest which indicates at least an original name associated with a content object, wherein the name is a hierarchically structured variable length identifier (HSVLI) which comprises contiguous name components ordered from a most general level to a most specific level. The system renames the content object with a new name. The system also creates a new manifest which indicates the new name, wherein the new manifest includes original authentication information associated with the original manifest.

25 Claims, 6 Drawing Sheets

(56) References Cited

U.S. PATENT DOCUMENTS

| | | | |
|---|---|---|---|
| 5,110,856 A | 5/1992 | Oyamada | |
| 5,506,844 A | 4/1996 | Rao | |
| 5,629,370 A | 5/1997 | Freidzon | |
| 5,870,605 A | 2/1999 | Bracho | |
| 6,052,683 A | 4/2000 | Irwin | |
| 6,091,724 A | 7/2000 | Chandra | |
| 6,173,364 B1 | 1/2001 | Zenchelsky | |
| 6,226,618 B1 | 5/2001 | Downs | |
| 6,233,646 B1 | 5/2001 | Hahm | |
| 6,332,158 B1 | 12/2001 | Risley | |
| 6,366,988 B1 | 4/2002 | Skiba | |
| 6,574,377 B1 | 6/2003 | Cahill | |
| 6,629,150 B1 * | 9/2003 | Huded | G06F 21/64 707/999.004 |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,769,066 B1 | 7/2004 | Botros | |
| 6,772,333 B1 | 8/2004 | Brendel | |
| 6,862,280 B1 | 3/2005 | Bertagna | |
| 6,901,452 B1 | 5/2005 | Bertagna | |
| 6,917,985 B2 | 7/2005 | Madruga | |
| 6,968,393 B1 | 11/2005 | Chen | |
| 6,981,029 B1 | 12/2005 | Menditto | |
| 7,013,389 B1 | 3/2006 | Srivastava | |
| 7,031,308 B2 | 4/2006 | Garcia-Luna-Aceves | |
| 7,061,877 B1 | 6/2006 | Gummalla | |
| 7,206,860 B2 | 4/2007 | Murakami | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,382,787 B1 | 6/2008 | Barnes | |
| 7,406,597 B2 * | 7/2008 | Iyengar | H04L 9/3236 707/999.002 |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,769,887 B1 | 8/2010 | Bhattacharyya | |
| 7,779,467 B2 | 8/2010 | Choi | |
| 7,801,177 B2 | 9/2010 | Luss | |
| 7,816,441 B2 | 10/2010 | Elizalde | |
| 7,831,733 B2 | 11/2010 | Sultan | |
| 7,908,337 B2 | 3/2011 | Garcia-Luna-Aceves | |
| 7,924,837 B1 | 4/2011 | Shabtay | |
| 7,953,885 B1 | 5/2011 | Devireddy | |
| 7,974,221 B2 * | 7/2011 | Tamassia | H04L 63/12 370/256 |
| 8,000,267 B2 | 8/2011 | Solis | |
| 8,010,691 B2 | 8/2011 | Kollmansberger | |
| 8,074,289 B1 | 12/2011 | Carpentier | |
| 8,117,441 B2 | 2/2012 | Kurien | |
| 8,127,134 B2 * | 2/2012 | Iyengar | H04L 9/3236 707/999.002 |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,271,578 B2 | 9/2012 | Sheffi | |
| 8,312,064 B1 | 11/2012 | Gauvin | |
| 8,386,622 B2 | 2/2013 | Jacobson | |
| 8,467,297 B2 | 6/2013 | Liu | |
| 8,553,562 B2 | 10/2013 | Allan | |
| 8,572,049 B2 * | 10/2013 | Cheung | G06F 17/30864 707/687 |
| 8,572,214 B2 | 10/2013 | Garcia-Luna-Aceves | |
| 8,645,702 B2 * | 2/2014 | Zhang | H04L 9/3247 709/221 |
| 8,654,649 B2 | 2/2014 | Vasseur | |
| 8,665,757 B2 | 3/2014 | Kling | |
| 8,667,172 B2 | 3/2014 | Ravindran | |
| 8,688,619 B1 | 4/2014 | Ezick | |
| 8,699,350 B1 | 4/2014 | Kumar | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,862,774 B2 | 10/2014 | Vasseur | |
| 8,869,235 B2 * | 10/2014 | Qureshi | H04L 63/20 713/150 |
| 8,869,298 B2 * | 10/2014 | Kamperman | H04N 7/173 726/27 |
| 8,886,925 B2 * | 11/2014 | Qureshi | H04L 63/20 713/150 |
| 8,903,756 B2 | 12/2014 | Zhao | |
| 8,937,865 B1 | 1/2015 | Kumar | |
| 9,071,498 B2 | 6/2015 | Beser | |
| 9,112,895 B1 | 8/2015 | Lin | |
| 2002/0010795 A1 | 1/2002 | Brown | |
| 2002/0048269 A1 | 4/2002 | Hong | |
| 2002/0054507 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0176404 A1 | 11/2002 | Girard | |
| 2002/0188605 A1 | 12/2002 | Adya | |
| 2002/0199014 A1 | 12/2002 | Yang | |
| 2003/0009365 A1 * | 1/2003 | Tynan | G06F 17/3089 705/50 |
| 2003/0046437 A1 | 3/2003 | Eytchison | |
| 2003/0048793 A1 | 3/2003 | Pochon | |
| 2003/0051100 A1 | 3/2003 | Patel | |
| 2003/0074472 A1 | 4/2003 | Lucco | |
| 2003/0097447 A1 | 5/2003 | Johnston | |
| 2003/0140257 A1 | 7/2003 | Paterka | |
| 2004/0024879 A1 | 2/2004 | Dingman | |
| 2004/0030602 A1 | 2/2004 | Rosenquist | |
| 2004/0073715 A1 | 4/2004 | Folkes | |
| 2004/0139230 A1 | 7/2004 | Kim | |
| 2004/0221047 A1 | 11/2004 | Grover | |
| 2004/0225627 A1 | 11/2004 | Botros | |
| 2004/0252683 A1 | 12/2004 | Kennedy | |
| 2005/0003832 A1 | 1/2005 | Osafune | |
| 2005/0028156 A1 | 2/2005 | Hammond | |
| 2005/0038787 A1 * | 2/2005 | Cheung | G06F 17/30864 |
| 2005/0043060 A1 | 2/2005 | Brandenberg | |
| 2005/0050211 A1 | 3/2005 | Kaul | |
| 2005/0074001 A1 | 4/2005 | Mattes | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |
| 2005/0259637 A1 | 11/2005 | Chu | |
| 2005/0262217 A1 | 11/2005 | Nonaka | |
| 2005/0289222 A1 | 12/2005 | Sahim | |
| 2006/0010249 A1 | 1/2006 | Sabesan | |
| 2006/0029102 A1 | 2/2006 | Abe | |
| 2006/0039379 A1 | 2/2006 | Abe | |
| 2006/0051055 A1 | 3/2006 | Ohkawa | |

(56) References Cited

U.S. PATENT DOCUMENTS

| | | |
|---|---|---|
| 2006/0072523 A1 | 4/2006 | Richardson |
| 2006/0095763 A1* | 5/2006 | Iyengar ................ H04L 9/3236 713/167 |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0019520 A1* | 1/2009 | Iyengar ................ H04L 9/3236 726/2 |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0110935 A1* | 5/2010 | Tamassia ................ H04L 63/12 370/256 |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0178033 A1* | 7/2010 | Kamperman ......... H04L 9/3247 386/252 |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |

(56) References Cited

U.S. PATENT DOCUMENTS

| | | |
|---|---|---|
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166806 A1* | 6/2012 | Zhang .................. H04L 9/3247 713/176 |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2015/0347553 A1* | 12/2015 | Aizman ............ G06F 17/30578 713/189 |
| 2016/0205190 A1* | 7/2016 | Bestler .............. G06F 17/30312 709/217 |
| 2016/0224638 A1* | 8/2016 | Bestler .............. G06F 17/30548 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Baugher, M. et al., "Self-Verifying Names for Read-Only Named Data", INFOCOM Workshops, vol. 12, 2012.*

Xie et al. "Collaborative Forwarding and Caching in Content Centric Networks", Networking 2012.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

(56) References Cited

OTHER PUBLICATIONS

"Digital Signature" archived on Aug. 31, 2009 at http://web.archive.org/web/20090831170721/http://en.wikipedia.org/wiki/Digital_signature.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. Eurocrypt 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

(56) References Cited

OTHER PUBLICATIONS

S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.

(56) References Cited

OTHER PUBLICATIONS

"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn, "The Pairing-Based Cryptography Library", <http://crypto.stanford.edu/pbc/>, retrieved Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004, Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, "Collusion Resistant Broadcast Encryption With Short Ciphertexts and Private Keys", Annual International Cryptology Conference (pp. 258-275), Springer Berlin Heidelberg, 2005.
D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks,' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. (Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer to-Peer Overlays." NSDI. vol. 4. 2004.
H. Xiong, X. Zhang, W. Zhu, and D. Yao. "CloudSeal: End-to-End Content Protection in Cloud-based Storage and Delivery Services", International Conference on Security and Privacy in Communication Systems (pp. 491-500), Springer Berlin Heidelberg, 2011.
Heckerman, David, John S. Breese, and Koos Rommelse. "Decision-Theoretic Troubleshooting." Communications of the ACM. 1995.

* cited by examiner

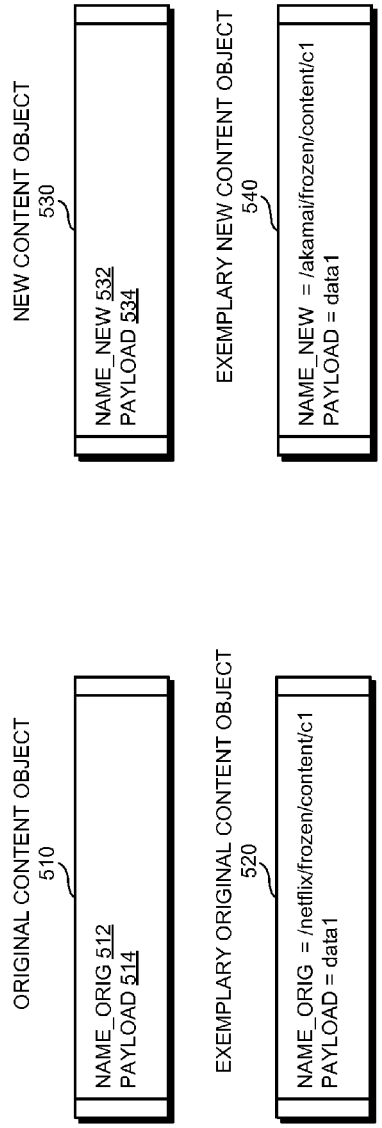
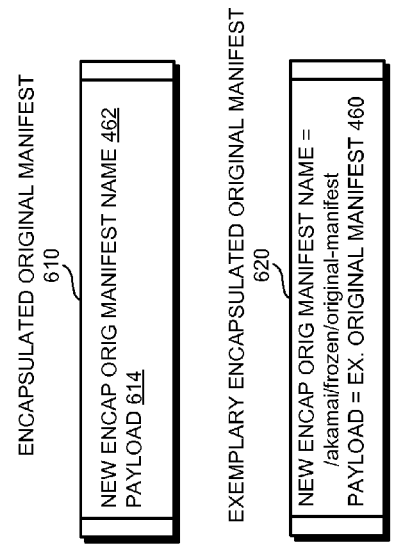
FIG. 5
FIG. 6

METHOD AND SYSTEM FOR VERIFYING RENAMED CONTENT USING MANIFESTS IN A CONTENT CENTRIC NETWORK

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/231,515, entitled "AGGREGATE SIGNING OF DATA IN CONTENT CENTRIC NETWORKING," by inventors Ersin Uzun, Marc E. Mosko, Michael F. Plass, and Glenn C. Scott, filed 31 Mar. 2014 (hereinafter "U.S. patent application Ser. No. 14/231,515");

the disclosures of which are herein incorporated by reference in their entirety.

BACKGROUND

Field

This disclosure is generally related to distribution of digital content. More specifically, this disclosure is related to verifying the original producer of content in a content centric network (CCN) by using manifests that rename objects and include authentication information for the original producer.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending Interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

In addition to the identifying name and a payload, CCN content objects can include a signature for the content producer. The signature binds the name, payload, and identity of the signer (e.g., the producer). The name is used to match, route, and forward the content. In order to move or redistribute the content to serve the content from a location that is not reachable by the same name (e.g., from a web-cache location other than the one corresponding to the name), a system can either update the routing information or rename the content. However, updating the routing information can result in computational overhead due to modifying the routing tables (e.g., Forwarding Information Bases) at intermediate routers within a CCN. Furthermore, renaming the content breaks the binding security association between the unique name of the content and the authentication information of the producer (e.g., the signature and the identity), leaving a receiving CCN entity with no way to authenticate the original producer of the content.

SUMMARY

One embodiment provides a system that facilitates redistribution of content objects with a different name without requiring re-computation of the original authentication information. During operation, the system determines, by a content producing device, an original manifest which indicates at least an original name associated with a content object, wherein the name is a hierarchically structured variable length identifier (HSVLI) which comprises contiguous name components ordered from a most general level to a most specific level. The system renames the content object with a new name. The system also creates a new manifest which indicates the new name, wherein the new manifest includes original authentication information associated with the original manifest.

In some embodiments, the original authentication information indicates one or more of: an identity of a producer of the original manifest; and a digital signature of the producer of the original manifest.

In some embodiments, the original authentication information is one or more of: information embedded in the new manifest; information derived from the original manifest; and a linked object that is derived from the original manifest, wherein the linked object is an object which is distinct from the original manifest.

In some embodiments, renaming the content object involves one or more of: adding a prefix to the original name; replacing a part of the original name with a part of the new name; and any function that creates a one-to-one mapping of the new name to the original name.

In some embodiments, the original authentication information indicates a self-certifying name based on the original name, wherein the self-certifying name uniquely identifies the content object.

In some embodiments, the self-certifying name includes a cryptographic digest of the content object.

In some embodiments, the new manifest indicates a self-certifying name based on the new name, wherein the self-certifying name uniquely identifies the content object.

In some embodiments, the system receives, by a content consuming device, a new manifest which indicates at least a new name associated with a content object, wherein the name is a hierarchically structured variable length identifier (HSVLI) which comprises contiguous name components ordered from a most general level to a most specific level, and wherein the new manifest includes original authentication information associated with an original manifest which indicates an original name associated with the content object. The system retrieves the content object based on the new name. The system also verifies the retrieved content object by: replacing the new name with the original name; and authenticating the content object with the original name using the original authentication information, thereby facilitating redistribution of content objects with a different name without requiring re-computation of the original authentication information.

In some embodiments, the system retrieves the original manifest, wherein the original authentication information indicates a self-certifying name based on the original name, and wherein the self-certifying name uniquely identifies the content object.

In some embodiments, the system verifies the original manifest by authenticating a digital signature of a producer of the original manifest based on a public key of the producer.

In some embodiments, verifying the obtained content object further comprises: calculating a self-certifying name for the content object based on the original name; comparing the calculated self-certifying name with the self-certifying name indicated in the original authentication information; and responsive to determining that the calculated self-certifying name matches the self-certifying name indicated in the original authentication information, authenticating the obtained content object.

BRIEF DESCRIPTION OF THE FIGURES

FIG. 5 presents tables depicting a format of an original content object, an exemplary original content object, a format of a new content object, and an exemplary new content object, in accordance with an embodiment of the present invention.

FIG. 6 presents tables depicting a format of an encapsulated original manifest and an exemplary encapsulated original manifest, in accordance with an embodiment of the present invention.

DETAILED DESCRIPTION

Figure 1:
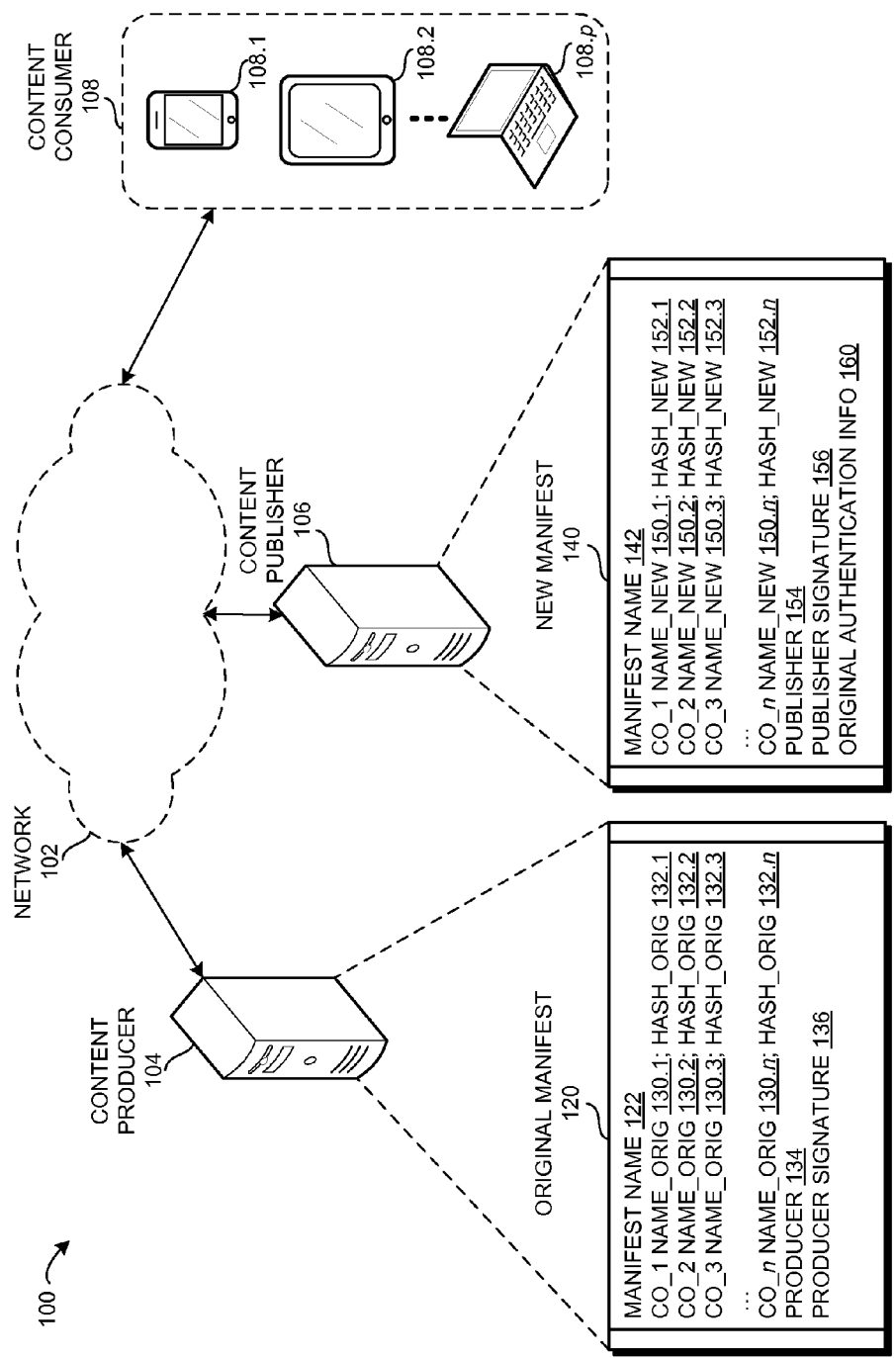
FIG. 1 illustrates an exemplary computing environment that facilitates redistribution of content objects with a different name without requiring re-computation of the original authentication information, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that facilitates redistribution of content objects with a different name without requiring re-computation of the original authentication information. This redistribution is achieved through the use of manifests and self-certifying content objects. A manifest is a content object that describes a collection of content objects and can include a name, a signature, and the identity of the signer (e.g., the content producer). A signed manifest can provide trust to a requesting application for the content objects described by the manifest. Signing and verifying aggregates of content objects through the use of a secure content catalog (e.g., a manifest) is described in U.S. patent application Ser. No. 14/231,515. A manifest can include a self-certifying name for each content object described in its collection. Upon receiving and verifying the manifest, a requesting application can trust the individual content objects by simply verifying the self-certifying name. A self-certifying name is a name that uniquely identifies the content, and can include a cryptographic hash of the content, a key/name combination, and a digest that is a last name component of the name. Because trust in the manifest has been established, the requesting application can verify a content object described in the manifest by verifying the self-certifying name (e.g., by calculating the hash value of the received content object) and comparing it to the self-certifying name included in the manifest. Because content objects are verified and authenticated through the manifest based on their self-certifying names (e.g., the content object hash), the content objects do not require a signature, though the manifest can contain a signature in some embodiments.

When a content re-publisher (e.g., a content caching service such as Akamai) wishes to re-publish content that has been previously published by the original content producer (e.g., a producer such as Netflix), the re-publisher can assign a new name to the content and, at the same time, preserve the security binding of the original content producer. For example, an original content producer publishes content and creates an original manifest that describes the content objects by original names. The original manifest can include a digital signature for all the content names, and each content name can include a hash for the corresponding content object. A content cache service wishes to re-publish the same content under a new name, so the content cache service encapsulates the original manifest under a new name. In addition, the content cache service renames each content object of the original manifest with a new name. As a result, each renamed content object has a new name, the same payload, and a different content object hash as the original content object hash. The content cache service also creates a new manifest that describes the content objects by their new names.

A user (e.g., a content consumer who wishes to view the content) can retrieve the content from the content cache service by first retrieving the new manifest and then retrieving the content objects described in the new manifest (by the new name). As discussed above, the content consumer can verify the content objects described in the new manifest by calculating the self-certifying name (e.g., by calculating a hash for the content object) and comparing it to the self-certifying name included in the manifest (e.g., the hash value included in the original name as indicated in the original manifest). In order to verify the original producer, the content consumer retrieves the encapsulated original manifest, verifies the original manifest by authenticating the digital signature of the original producer, and subsequently verifies each of the content objects described in the new manifest based on the hash included in each name. To verify each of the content objects described in the new manifest, the consumer renames each of the content objects by replacing the new name (as described in the new manifest) with the original name (as described in the original manifest). The consumer then authenticates the content object with the original name by calculating a hash for the content object and comparing that hash to the hash included in the original name indicated in the original manifest. Thus, the system redistributes the content objects under a new name without the computational overhead required to re-compute the original authentication information.

In addition to providing direct trust based on a digital signature by the producer, a manifest can provide indirect trust when the original link to the manifest is a self-certifying name (e.g., a hash-based name). A manifest can link to other manifests, thus creating a hierarchical structure of manifests through which trust can be chained and established. In some embodiments, the original producer manifest (e.g., the original manifest produced by the original content producer) is linked from the new publisher manifest (e.g., the new manifest published by the content cache service). The original manifest can be embedded in the new manifest. In some embodiments, the manifest contains a hash of the payload rather than a hash of the content object. In this case, the name is not a part of the data being hashed, so the name does not need to be re-written.

The original producer can sign a link (with a hash-based name) to a manifest, rather than sign the entire manifest itself. Thus, the new publisher manifest can include the link and the signature. Similarly, the content objects described in a manifest may or may not include signature information. If the signature information is included in the content objects with the original names, the signature information will not be valid under the new name. Note that the hash will still be valid, as the content of the payload itself does not change. If the signature information is not included in the content objects with the original names, the re-publisher can include signature information on the content objects with the new names. The re-publisher indicates accordingly to the content consumer that in order for the content consumer to verify the original producer (based on the self-certifying names in the original producer manifest) the included publisher signature information is to be stripped. In addition, if the re-publisher signs the content objects under the new names, the re-publisher can include in the new manifest keyId based links to the content objects, rather than the self-certifying name links. For example, the new manifest can include links to the content objects, and the re-publisher can include a private keyID for the links to the content objects that the content consumer can use to authenticate the content objects.

In examples described in this disclosure, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms are used to describe the CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Network Architecture and Overview of Manifests

FIG. 1 illustrates an exemplary computing environment 100 that facilitates redistribution of content objects with a different name without requiring re-computation of the original authentication information, in accordance with an embodiment of the present invention. Computing environment 100 can include a content producer 104 and a content publisher 106, both of which can include any content producing device that can publish or produce content and fulfill a request for content via a network 102. Computing environment 100 can also include a content consumer 108, which can include any content consuming device that can determine a request for content via a network 102. For example, client device 108 can include a smartphone 108.1, a tablet computer 108.2, and/or a personal computing device 108.p (e.g., a laptop). Computing environment 100 can also include network 102 which can be, for example, a content-centric network (CCN), a named data network (NDN), or an information-centric network (ICN). The term "content producer" is used herein to describe a content producer of original content, while the term "content publisher" is used herein to describe a content producer that publishes previously produced or previously published content (e.g., original content produced by a content producer).

During operation, content producer 104 produces original content and creates original manifest 120 to describe the original content. Original manifest 120 contains a manifest name 122 and a list of content objects by an original name 130.1-130.n. Original manifest 120 can also contain an original hash value 132.1-132.n associated with each content object. In some embodiments, the hash value 132.1-132.n can be part of a self-certifying name which, when hashed, is a name which uniquely identifies the content object. In addition, original manifest 120 can contain an identity of a producer 134 and a producer signature 136.

In order to republish the original content under a different name and at the same time maintain the security binding of the original content to content producer 104, content publisher 106 renames the content objects with new names and creates a new manifest 140 which contains a manifest name 142 and a list of content objects by a new name 150.1-150.n. New manifest 140 can also contain new hash values 152.1-152.n associated with each content object. Similar to original hash values 132.1-132.n of original manifest 120, new hash values 152.1-152.n can be part of a self-certifying name which, when hashed, is a name which uniquely identifies the content object. The content objects with new names 150.1-150.n have different names than the original names 130.1-130.n, result in new hash values 152.1-152.n that are different from original hash values 130.1-130.n, but each contain the same data or payload as the corresponding content objects with original names 130.1-130.n. Additionally, new manifest 140 can contain an identity of a publisher 154, a publisher signature 156, and original authentication information 160 which indicates information relating to original manifest 120.

Content Publisher Creates New Manifest

Figure 2:
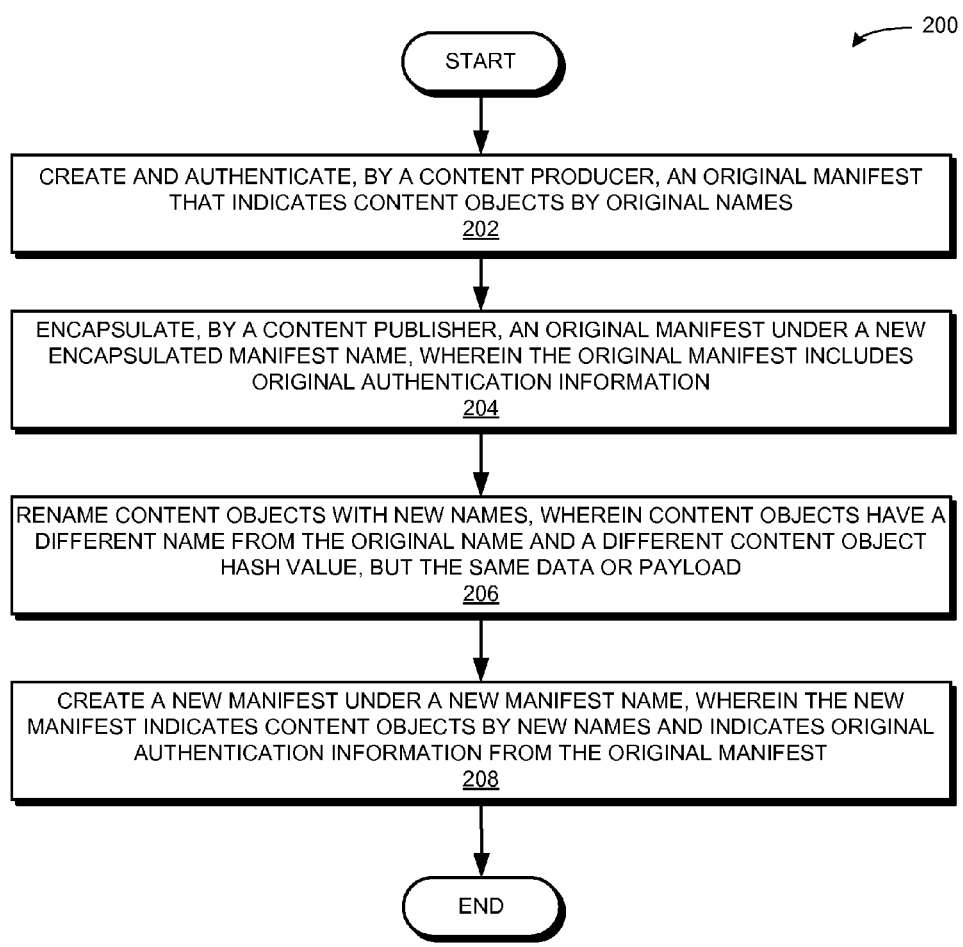
FIG. 2 presents a flow chart illustrating a method performed by a content publisher for creating a new manifest based on an original manifest created by a content producer, in accordance with an embodiment of the present invention.

FIG. 2 presents a flow chart 200 illustrating a method performed by a content publisher for creating a new manifest based on an original manifest created by a content producer, in accordance with an embodiment of the present invention. During operation, the system creates, by a content producer, an original manifest that indicates content objects which are each associated with an original name (operation 202). The content producer authenticates the original manifest by including original authentication information for the original manifest ("original authentication information") (operation 202). In some embodiments, the original authentication information includes the identity of the original content producer and a signature of the producer. A content publisher encapsulates the original manifest, including the original authentication information, under a new encapsulated original manifest name (operation 204). The content publisher renames the content objects with a new name, such that the content objects are associated with a name that is different from the original name, produce a different content object hash value, but contain the same payload data (operation 206). In some embodiments, the system derives the new name from the original name. The system can rename the content objects based on a one-to-one mapping function such as adding a prefix to the original name or replacing a part of the original name with a part of the new name. Finally, the content publisher creates a new manifest under a new manifest name, where the new manifest indicates content objects which are each associated with a new name (operation 208). The new manifest also includes the original authentication information from the original manifest.

Consumer Retrieves Content, Verifies Producer, and Verifies Content

Figure 3:
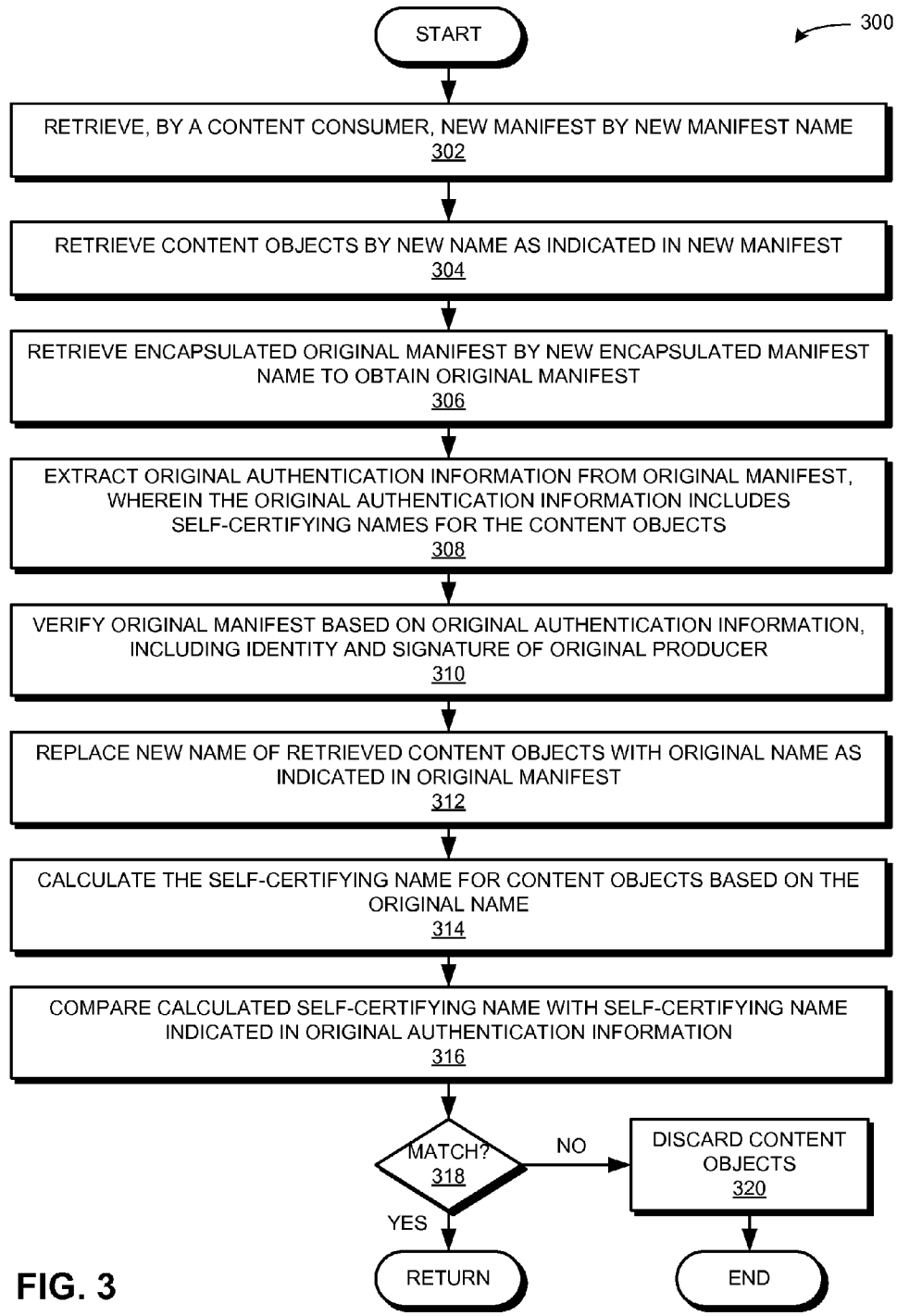
FIG. 3 presents a flow chart illustrating a method performed by a content consumer for retrieving content based on a new manifest, verifying the original producer of the content, and verifying the content, in accordance with an embodiment of the present invention.

FIG. 3 presents a flow chart 300 illustrating a method performed by a content consumer for retrieving content based on a new manifest, verifying the original producer of the content, and verifying the content, in accordance with an embodiment of the present invention. During operation, a content consumer retrieves a new manifest using the new manifest name (operation 302). The new manifest indicates content objects which are each associated with a new name. The content consumer retrieves the content objects by the new names as indicated in the new manifest (operation 304). The content consumer retrieves the encapsulated original manifest under the new encapsulated original manifest name in order to obtain a copy of the original manifest (operation 306). The content consumer then extracts the original authentication information from the original manifest (operation 308). As discussed above, the original authentication information can include the identity of the producer and a signature of the producer. The original authentication information can also include a self-certifying name for the content objects. For example, the self-certifying name can be a name that includes a hash of the content (e.g., a cryptographic digest), a key/name combination, and a digest that is a last name component of the name. As described above, because the manifest itself is signed and because the content objects can be verified through their self-certifying names, the content objects do not require an individual signature, though in some embodiments, the content objects can contain an individual signature.

Subsequently, the content consumer verifies the original manifest based on the original authentication information, which includes the identity and signature of the original producer (operation 310). For example, the content consumer can use a known signature verification function and a public key of the identified original producer to authenticate the original manifest. In some embodiments, the content consumer does not require verification of the original producer, and therefore does not perform the step described by operation 310.

The content consumer then verifies the retrieved content objects, which are each associated with a new name. First, the content consumer replaces the new name of each content object with the original name as indicated in the original manifest (operation 312). In some embodiments, the system replaces the new name based on a one-to-one mapping function, such as replacing a part of the new name with a part of the original name or removing a part of the new name to obtain the original name. For example, when creating the new name, the content publisher can add a prefix to the old name, such that when the consumer checks for trust (e.g., verifies the original producer, the original manifest, and each content object described in the new manifest), the consumer needs only remove the prefix in order to convert the content object name back to the original name. Second, the content consumer calculates the self-certifying name for the content objects associated with names that have been converted back to the original name (operation 314). In some embodiments, the system performs a hash function on the content object associated with the original name. Finally, the content consumer compares the calculated self-certifying name with the self-certifying name indicated in the original authentication information (as described in the original manifest) (operation 316). In some embodiments, the system compares the calculated hash value (from operation 314) of the content object associated with the original name and compares that to the hash value of the originally named content object as described in the original manifest. If there is a match (decision 318), the method returns, indicating that the retrieved content objects have been properly authenticated.

If there is not a match, the system will discard or ignore the content objects (operation 320).

Exemplary Format of Original and New Manifests

Figure 4:
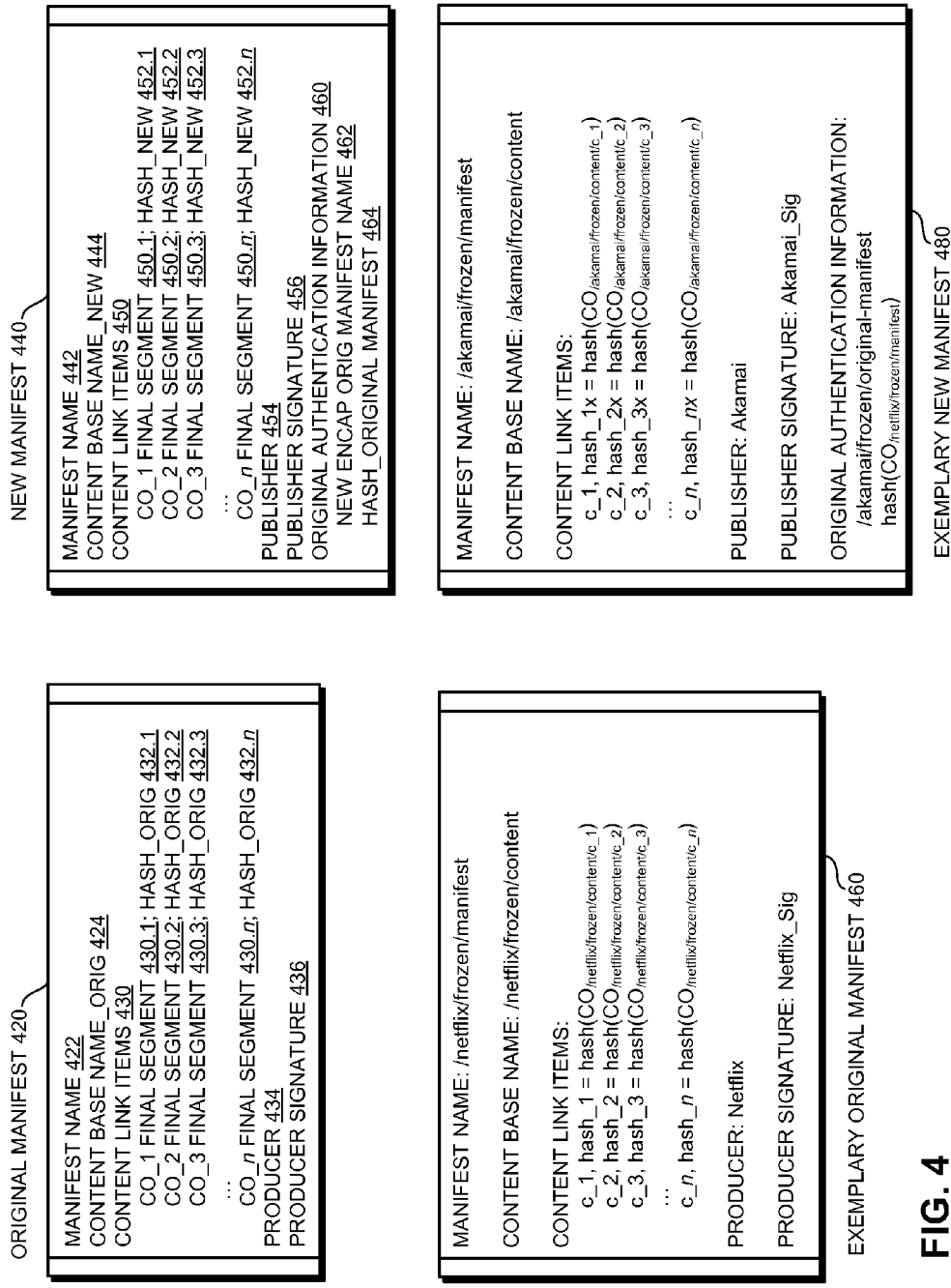
FIG. 4 presents tables depicting a format of an original manifest, an exemplary original manifest, a format of a new manifest, and an exemplary new manifest, in accordance with an embodiment of the present invention.

FIG. 4 presents tables depicting a format of an original manifest 420, a format of a new manifest 440, an exemplary original manifest 460, and an exemplary new manifest 480, in accordance with an embodiment of the present invention. The content objects described in a manifest can be represented by various schemes. One scheme is to list the name of each content object and the corresponding hash value. Another scheme is to use a common naming or link root (e.g., a content base name) and a list of final segment names along with their corresponding hash values. Another scheme is to use a predictable name, such as a counter. The tables in FIG. 4 depict the use of a content base name and a list of final segment names. Original manifest 420 can contain a manifest name 422, an original content base name 424, content link items 430, an identity of a producer 434, and a producer signature 436. Content link items 430 can include a final segment 430.1-430.n and an original hash value 432.1-432.n. Exemplary original manifest 460 depicts a manifest that includes: a manifest name of "/netflix/frozen/manifest"; an original content base name of "/netflix/frozen/content"; content links items number 1-n, where the name of the final segment of the content object numbered 1 is "c_1" with a corresponding hash value of "hash($CO_{/netflix/frozen/content/c\_1}$)"; an identity of the producer with a value of "Netflix"; and a producer signature with a value of "Netflix_Sig."

Similarly, new manifest 440 can contain a manifest name 442, a new content base name 444, content link items 450, an identity of the publisher 454, and a publisher signature 456. Content link items 450 can include a final segment 450.1-450.n and a new hash value 452.1-452.n. New manifest 440 can also include original authentication information 460, which can include a new encapsulated original manifest name 462 and an original manifest hash value 464. Exemplary original manifest 480 depicts a manifest that includes: a manifest name of "/akamai/frozen/manifest"; an original content base name of "/akamai/frozen/content"; content link items numbered 1-n, where the name of the final segment of the content object numbered 1 is "c_1" with a corresponding hash value of "hash($CO_{/akamai/frozen/content/c\_1}$)"; an identity of the publisher with a value of "Akamai"; and a publisher signature with a value of "Akamai_Sig." Exemplary original manifest 480 can also include original authentication information which includes: a new encapsulated original manifest name of "/akamai/frozen/original-manifest"; and an original manifest hash value of "hash($CO_{/netflix/frozen/manifest}$)."

In FIG. 4, the original authentication information is depicted as including the new encapsulated original manifest name and the hash of the original manifest (e.g., the original authentication information is information embedded in the new manifest). In some embodiments, the original authentication information is information derived from the original manifest. The original authentication information can also be a linked object that is derived from the original manifest, where the linked object is an object which is distinct from the original manifest (e.g., a pointer to a separate object). In other embodiments, the original authentication information indicates the hash of the content objects described by the manifest, which are depicted in original manifest 420 and new manifest 440 of FIG. 4 as part of content link items 430 and 450, respectively (e.g., a self-certifying name).

Exemplary Format of Other Objects

FIG. 5 presents tables depicting a format of an original content object 510, an exemplary original content object 520, a format of a new content object 530, and an exemplary new content object 540, in accordance with an embodiment of the present invention. Original content object 510 includes an original name 512 and a payload 514. Exemplary original content object 520 includes an original name with a value of "/netflix/frozen/content/c1" and a payload with a value of "data1." New content object 530 includes a new name 532 and a payload 534. Exemplary new content object 540 includes a new name with a value of "/akamai/frozen/content/c1" and a payload with a value of "data1." Note that while the new name and the original name are different, the payload data for both exemplary original content object 520 and exemplary new content object 540 are the same (e.g., "data1"). Furthermore, a self-certifying name (not illustrated) that includes a hash value of the content object based on the name (e.g., the new name for exemplary new content object 540 and the original name for exemplary original content object 520) is different for each of exemplary original content object 520 and exemplary new content object 540.

FIG. 6 presents tables depicting a format of an encapsulated original manifest 610 and an exemplary encapsulated original manifest 620, in accordance with an embodiment of the present invention. Encapsulated original manifest 610 includes a new encapsulated manifest name 462 and a payload 614. Exemplary encapsulated original manifest 620 includes a new encapsulated original manifest name with a value of "/akamai/frozen/original-manifest" and a payload with a value equal to the original manifest (e.g., exemplary original manifest 460 as depicted in FIG. 4).

Use Case Based on Exemplary Manifests and Other Objects

The use case below is based on the exemplary tables presented and described in relation to FIGS. 4-6 and the methods disclosed herein. A content producer (e.g., Netflix) creates exemplary original manifest 460 that describes content objects associated with original names. The original names include an original content base name 424 and a final segment 430.1-430.n (e.g., "/netflix/frozen/content/c_1"). Original manifest 460 includes original authentication information which can indicate corresponding hash values for each content object (e.g., "hash($CO_{/netflix/frozen/content/c\_1}$)"). Netflix, as the content producer, authenticates original manifest 460 by including its identity 434 and signature 436, "Netflix" and "Netflix_Sig," respectively. A content publisher (e.g., Akamai) encapsulates original manifest 460 by creating exemplary encapsulated original manifest 620, with a new encapsulated original manifest name 462 of "/akamai/frozen/original-manifest." Akamai renames the content objects with new names comprised of a new content base name 444 and a final segment 450.1-450.n (e.g., "/akamai/frozen/content/c_1"). Akamai creates exemplary new manifest 480 with a manifest name 442 of "/akamai/frozen/manifest" where new manifest 480 describes content objects by the new names and includes original authentication information from original manifest 460.

A consumer retrieves new manifest 480 under new manifest name 442 of "/akamai/frozen/manifest", where new manifest 480 includes original authentication information 460. The consumer retrieves the content objects described in new manifest 480 (e.g., content objects under the new name of "/akamai/frozen/content/c_1", etc.). The consumer then retrieves encapsulated original manifest 620 based on new encapsulated original manifest name 462 (e.g., "/akamai/frozen/original-manifest") included in original authentication information 460. The consumer now has a copy of original manifest 460 and new manifest 480.

The consumer verifies original manifest 460 based on the original authentication information. For example, the consumer uses a regular signature verification based on a public key of identified original producer 434. The consumer then verifies the retrieved content objects described in new manifest 480. First, for each retrieved content object, the consumer replaces the new name that includes new content base name 444 and final segment 450.1 (e.g., "/akamai/frozen/content/c_1") with the original name that includes original content base name 424 and final segment 430.1, as indicated in the original manifest (e.g., "/netflix/frozen/content/c_1"). Next, the consumer calculates the self-certifying name for the content object based on the original name as derived from the new name (e.g., "hash($CO_{/netflix/frozen/content/c\_1}$)"). Finally, the consumer compares the calculated self-certifying name with the self-certifying name indicated in the original authentication information (e.g., original hash value 432.1 of "hash_1=hash($CO_{/netflix/frozen/content/c\_1}$)"). A match authenticates the retrieved content object by confirming that the renamed content object contains the same data as the originally named content object. If there is no match, the retrieved content object is not authenticated and the system can discard or ignore the content object.

Exemplary Computer and Communication System

Figure 7:
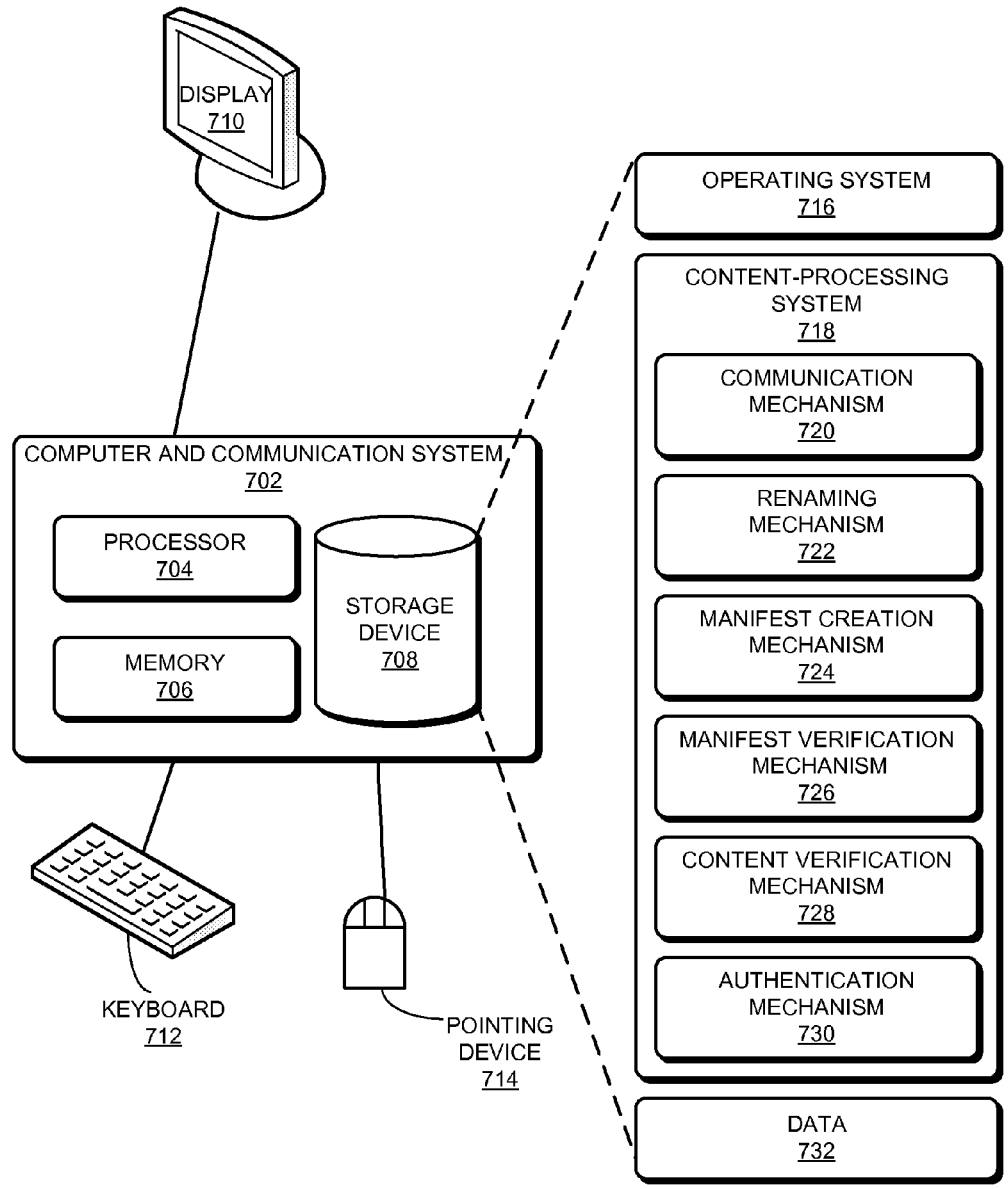
FIG. 7 illustrates an exemplary computer and communication system that facilitates redistribution of content objects with a different name without requiring re-computation of the original authentication information, in accordance with an embodiment of the present invention In the figures, like reference numerals refer to the same figure elements.

FIG. 7 illustrates an exemplary computer and communication system 702 that facilitates redistribution of content objects with a different name without requiring re-computation of the original authentication information, in accordance with an embodiment of the present invention. Computer and communication system 702 includes a processor 704, a memory 706, and a storage device 708. Memory 706 can include a volatile memory (e.g., RAM) that serves as a managed memory, and can be used to store one or more memory pools. Furthermore, computer and communication system 702 can be coupled to a display device 710, a keyboard 712, and a pointing device 714. Storage device 708 can store an operating system 716, a content-processing system 718, and data 732.

Content-processing system 718 can include instructions, which when executed by computer and communication system 702, can cause computer and communication system 702 to perform methods and/or processes described in this disclosure. Specifically, content-processing system 718 may include instructions for determining, by a content producing device, an original manifest which indicates at least an original name associated with a content object, wherein the name is a hierarchically structured variable length identifier (HSVLI) which comprises contiguous name components ordered from a most general level to a most specific level (communication mechanism 720). Content-processing system 718 can include instructions for renaming the content object with a new name (renaming mechanism 722). Content-processing system 718 can also include instructions for creating a new manifest which indicates the new name, where the new manifest includes original authentication information associated with the original manifest (manifest creation mechanism 724).

Content-processing system 718 can further include instructions for renaming the content object, which involves one or more of: adding a prefix to the original name; replacing a part of the original name with a part of the new name; and any function that creates a one-to-one mapping of the new name to the original name (renaming mechanism 722).

Content-processing system 718 can additionally include instructions for receiving, by a content consuming device, a new manifest which indicates at least a new name associated with a content object, wherein the name is a hierarchically structured variable length identifier (HSVLI) which comprises contiguous name components ordered from a most general level to a most specific level, and wherein the new manifest includes original authentication information associated with an original manifest which indicates an original name associated with the content object (communication mechanism 720). Content-processing system 718 can include instructions for retrieving the content object based on the new name (communication mechanism 720). Content-processing system 718 can include instructions for verifying the obtained content object by: replacing the new name with the original name; and authenticating the content object with the original name using the original authentication information (content verification mechanism 726). Content-processing system 718 can also include instructions for calculating a self-certifying name for the content object based on the original name (content verification mechanism 728), comparing the calculated self-certifying name with the self-certifying name indicated in the original authentication information (content verification mechanism 728), and, responsive to determining that the calculated self-certifying name matches the self-certifying name indicated in the original authentication information, authenticating the obtained content object (authentication mechanism 730).

Content-processing system 718 can include instructions for retrieving the original manifest, wherein the original authentication information indicates a self-certifying name based on the original name, and wherein the self-certifying name uniquely identifies the content object (communication mechanism 720). Content-processing system 718 can also include instructions for verifying the original manifest by authenticating a digital signature of a producer of the original manifest based on a public key of producer (manifest verification mechanism 726).

Data 732 can include any data that is required as input or that is generated as output by the methods and/or processes described in this disclosure. Specifically, data 732 can store at least: an original manifest which indicates at least an original name associated with a content object, wherein the name is a hierarchically structured variable length identifier (HSVLI) which comprises contiguous name components ordered from a most general level to a most specific level; a new manifest which indicates at least a new name associated with a content object; an original name; a new name; a content object associated with the original name; a content object associated with the new name; an encapsulated original manifest; an encapsulated original manifest name; a manifest name; a content base name; a content link item; a final segment name; original authentication information associated with the original manifest; an identity of a producer of the original manifest; a digital signature of the producer of the original manifest; a self-certifying name based on the original name, wherein the self-certifying name uniquely identifies the content object; a hash of the content object; and a calculated self-certifying name based on the original name as obtained from the original manifest.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for authenticating content, comprising:
   determining, by a content publishing device, an original manifest which includes an original manifest name and indicates at least an original content name associated with a content object, wherein a name is a hierarchically structured variable length identifier (HSVLI) which comprises contiguous name components ordered from a most general level to a most specific level;
   encapsulating the original manifest based on an encapsulation name for the original manifest;
   renaming the content object with a new content name; and
   creating a new manifest which includes a new manifest name and indicates the new content name, wherein the new manifest further includes original authentication information associated with the original manifest, wherein the original authentication information includes the encapsulation name for the original manifest, thereby facilitating redistribution of content objects with a different name without requiring re-computation of the original authentication information.

2. The method of claim 1, wherein the original authentication information indicates one or more of:
   an identity of a producer of the original manifest; and
   a digital signature of the producer of the original manifest.

3. The method of claim 1, wherein the original authentication information is one or more of:
   information embedded in the new manifest;
   information derived from the original manifest; and
   a linked object that is derived from the original manifest, wherein the linked object is an object which is distinct from the original manifest.

4. The method of claim 1, wherein renaming the content object involves one or more of:
   adding a prefix to the original content name;
   replacing a part of the original content name with a part of the new content name; and
   any function that creates a one-to-one mapping of the new content name to the original content name.

5. The method of claim 1, wherein the original authentication information indicates a self-certifying name based on the original content name, wherein the self-certifying name uniquely identifies the content object.

6. The method of claim 5, wherein the self-certifying name includes a cryptographic digest of the content object.

7. The method of claim 1, wherein the new manifest indicates a self-certifying name based on the new content name, and wherein the self-certifying name uniquely identifies the content object.

8. A computer-implemented method comprising:
   receiving, by a content consuming device, a new manifest which includes a new manifest name and indicates at least a new content name associated with a content object, wherein a name is a hierarchically structured variable length identifier (HSVLI) which comprises contiguous name components ordered from a most general level to a most specific level, wherein the new manifest further includes original authentication information associated with an original manifest which indicates an original content name associated with the content object, and wherein the original authentication information includes an encapsulation name for the original manifest;
   retrieving the content object based on the new content name;
   retrieving the original manifest based on the encapsulation name; and
   verifying the retrieved content object by:
      replacing the new content name with the original content name; and
      authenticating the retrieved content object with the original content name based on the original authentication information from the retrieved original manifest, thereby facilitating redistribution of content objects with different names without requiring re-computation of the original authentication information.

9. The method of claim 8, wherein the original authentication information indicates one or more of:
   an identity of a producer of the original manifest; and
   a digital signature of the producer of the original manifest.

10. The method of claim 8, wherein the original authentication information is one or more of:
    information embedded in the new manifest;
    information derived from the original manifest; and
    a linked object that is derived from the original manifest, wherein the linked object is an object which is separate from the original manifest.

11. The method of claim 8,
    wherein the original authentication information indicates a self-certifying name based on the original content name, and wherein the self-certifying name uniquely identifies the content object.

12. The method of claim 8, further comprising:
    verifying the original manifest by authenticating a digital signature of a producer of the original manifest based on a public key of the producer.

13. The method of claim 8, wherein verifying the retrieved content object further comprises:

calculating a self-certifying name for the content object based on the original content name;

comparing the calculated self-certifying name with a self-certifying name indicated in the original authentication information; and responsive to determining that the calculated self-certifying name matches the self-certifying name indicated in the original authentication information, authenticating the retrieved content object.

14. A computer system for authenticating content, the computer system comprising:

a processor; and a storage device coupled to the processor and storing instructions that when executed by the processor cause the computer system to perform a method, the method comprising:

determining, by a content publishing device, an original manifest which includes an original manifest name and indicates at least an original content name associated with a content object, wherein a name is a hierarchically structured variable length identifier (HSVLI) which comprises contiguous name components ordered from a most general level to a most specific level;

encapsulating the original manifest based on an encapsulation name for the original manifest;

renaming the content object with a new content name; and creating a new manifest which includes a new manifest name and indicates the new content name, wherein the new manifest further includes original authentication information associated with the original manifest, wherein the original authentication information includes the encapsulation name for the original manifest, thereby facilitating redistribution of content objects with a different name without requiring re-computation of the original authentication information.

15. The computer system of claim 14, wherein the original authentication information indicates one or more of:

an identity of a producer of the original manifest; and a digital signature of the producer of the original manifest.

16. The computer system of claim 14, wherein the original authentication information is one or more of:

information embedded in the new manifest;

information derived from the original manifest; and a linked object that is derived from the original manifest, wherein the linked object is an object which is distinct from the original manifest.

17. The computer system of claim 14, wherein renaming the content object involves one or more of:

adding a prefix to the original content name;

replacing a part of the original content name with a part of the new content name; and any function that creates a one-to-one mapping of the new content name to the original content name.

18. The computer system of claim 14, wherein the original authentication information indicates a self-certifying name based on the original content name, wherein the self-certifying name includes a cryptographic digest of the content object.

19. The computer system of claim 14, wherein the new manifest indicates a self-certifying name based on the new content name, and wherein the self-certifying name uniquely identifies the content object.

20. A computer system for authenticating content, the computer system comprising:

a processor; and a storage device coupled to the processor and storing instructions that when executed by the processor cause the computer system to perform a method, the method comprising:

receiving, by a content consuming device, a new manifest which includes a new manifest name and indicates at least a new content name associated with a content object, wherein a name is a hierarchically structured variable length identifier (HSVLI) which comprises contiguous name components ordered from a most general level to a most specific level, wherein the new manifest further includes original authentication information associated with an original manifest which indicates an original content name associated with the content object, and wherein the original authentication information includes an encapsulation name for the original manifest;

retrieving the content object based on the new content name;

retrieving the original manifest based on the encapsulation name; and verifying the retrieved content object by:

replacing the new content name with the original content name; and authenticating the retrieved content object with the original content name based on the original authentication information from the retrieved original manifest, thereby facilitating redistribution of content objects with different names without requiring re-computation of the original authentication information.

21. The computer system of claim 20, wherein the original authentication information indicates one or more of:

an identity of a producer of the original manifest; and a digital signature of the producer of the original manifest.

22. The computer system of claim 20, wherein the original authentication information is one or more of:

information embedded in the new manifest;

information derived from the original manifest; and a linked object that is derived from the original manifest, wherein the linked object is an object which is separate from the original manifest.

23. The computer system of claim 20, wherein the original authentication information indicates a self-certifying name based on the original content name, and wherein the self-certifying name uniquely identifies the content object.

24. The computer system of claim 20, wherein the method further comprises:

verifying the original manifest by authenticating a digital signature of a producer of the original manifest based on a public key of the producer.

25. The computer system of claim 20, wherein verifying the retrieved content object further comprises:

calculating a self-certifying name for the content object based on the original content name;

comparing the calculated self-certifying name with a self-certifying name indicated in the original authentication information; and responsive to determining that the calculated self-certifying name matches the self-certifying name indicated in the original authentication information, authenticating the retrieved content object.

* * * * *